(12) United States Patent
Albrecht et al.

(10) Patent No.: US 7,452,171 B2
(45) Date of Patent: Nov. 18, 2008

(54) WELDING STUD

(75) Inventors: Bruce Albrecht, Hortonville, WI (US); Sean P. Moran, Neenah, WI (US); Sundaram Nagarajan, Troy, OH (US); Mark Ulrich, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 38 days.

(21) Appl. No.: 10/707,214

(22) Filed: Nov. 26, 2003

(65) Prior Publication Data

US 2005/0111932 A1 May 26, 2005

(51) Int. Cl.
*F16B 37/06* (2006.01)

(52) U.S. Cl. .......................... 411/171; 219/98

(58) Field of Classification Search ................. 411/171; 219/97, 98, 99
See application file for complete search history.

(56) References Cited

U.S. PATENT DOCUMENTS

| | | | | | |
|---|---|---|---|---|---|
| 2,054,187 | A | * | 9/1936 | Almdale | 219/93 |
| 2,096,623 | A | * | 10/1937 | Almdale | 470/20 |
| 2,623,974 | A | * | 12/1952 | Prucha | 219/93 |
| 2,707,507 | A | * | 5/1955 | Tripp et al. | 411/171 |
| 2,708,129 | A | * | 5/1955 | Keleman et al. | 219/98 |
| 2,775,685 | A | * | 12/1956 | Webster | 219/99 |
| 2,784,758 | A | * | 3/1957 | Rohe | 411/171 |
| 2,788,233 | A | * | 4/1957 | Enright | 219/98 |
| 2,823,297 | A | * | 2/1958 | Aversten | 219/99 |
| 2,883,215 | A | * | 4/1959 | Jenkins | 219/98 |
| 2,893,762 | A | * | 7/1959 | Haynes | 219/98 |
| 3,199,566 | A | * | 8/1965 | Dyka | 411/171 |
| 3,226,140 | A | * | 12/1965 | Voegeli | 403/272 |
| 3,253,115 | A | * | 5/1966 | Logan | 219/99 |
| 3,279,517 | A | * | 10/1966 | Logan | 411/171 |
| 3,363,084 | A | * | 1/1968 | Busing | 219/99 |
| 3,541,294 | A | * | 11/1970 | Jerdonek | 219/99 |
| 3,557,339 | A | * | 1/1971 | Rondeau | 219/99 |
| 3,671,710 | A | * | 6/1972 | Coombs | 219/99 |
| 3,760,143 | A | * | 9/1973 | Rondeau et al. | 428/558 |
| 3,891,332 | A | * | 6/1975 | Molyneux et al. | 403/13 |
| 3,905,173 | A | * | 9/1975 | Gerken | 403/242 |
| 3,975,611 | A | * | 8/1976 | Gordon | 219/98 |

(Continued)

FOREIGN PATENT DOCUMENTS

DE 75 22 984 U 5/1977

(Continued)

OTHER PUBLICATIONS

Aufhauser NPL http://www.brazing.com/products/Fluxes/index_weldingflux.asp.*

(Continued)

*Primary Examiner*—Willliam L. Miller
(74) *Attorney, Agent, or Firm*—Ziolkowski Patent Solutions Group, SC

(57) ABSTRACT

A welding stud apparatus and method of manufacturing a welding stud are disclosed. The welding stud has a weld end constructed to be welded to a workpiece that has at least one recess formed therein. The recess decreases an effective arc area of the weld end to localize a current therethrough and increase the efficiency with which the welding stud can be welded to a workpiece.

29 Claims, 4 Drawing Sheets

U.S. PATENT DOCUMENTS

| | | | | | |
|---|---|---|---|---|---|
| 3,997,754 | A | * | 12/1976 | Moliner et al. | 219/99 |
| 4,119,827 | A | * | 10/1978 | Lenox | 219/98 |
| 4,130,751 | A | * | 12/1978 | Gordon | 219/98 |
| 4,160,148 | A | * | 7/1979 | Jenkins | 219/98 |
| 4,214,144 | A | * | 7/1980 | Spiegelberg | 219/99 |
| 4,263,831 | A | * | 4/1981 | Smith | 411/171 |
| 4,429,209 | A | * | 1/1984 | Hinden | 219/98 |
| 4,482,795 | A | * | 11/1984 | Hinden | 219/98 |
| 4,672,164 | A | * | 6/1987 | Devletian | 219/96 |
| 4,684,304 | A | * | 8/1987 | Franks | 411/171 |
| 4,766,283 | A | * | 8/1988 | McCorvey et al. | 219/98 |
| 4,850,772 | A | * | 7/1989 | Jenkins | 411/171 |
| 4,855,561 | A | * | 8/1989 | Hinden | 219/93 |
| 4,855,562 | A | * | 8/1989 | Hinden | 219/93 |
| 5,130,510 | A | * | 7/1992 | Zeigler et al. | 219/99 |
| 5,135,154 | A | * | 8/1992 | Yoshida et al. | 228/46 |
| 5,345,054 | A | * | 9/1994 | Li | 219/98 |
| 5,493,833 | A | * | 2/1996 | Irimies | 52/336 |
| 5,533,850 | A | * | 7/1996 | Ishihara et al. | 411/171 |
| 5,618,491 | A | * | 4/1997 | Kurup et al. | 420/77 |
| 5,685,680 | A | * | 11/1997 | Duffy et al. | 411/171 |
| 5,834,727 | A | * | 11/1998 | Volnhals | 219/98 |
| 6,238,121 | B1 | * | 5/2001 | Roser | 403/13 |
| 6,497,543 | B1 | * | 12/2002 | Lyons | 411/171 |
| 6,596,959 | B2 | * | 7/2003 | Sichtermann et al. | 219/98 |
| 6,755,601 | B2 | * | 6/2004 | Ohta | 411/171 |
| 6,818,851 | B2 | * | 11/2004 | Ramasamy et al. | 219/98 |
| 6,860,687 | B1 | * | 3/2005 | Schmitt et al. | 411/171 |
| 2003/0175092 | A1 | * | 9/2003 | Ohta | 411/171 |
| 2003/0201254 | A1 | * | 10/2003 | Sichtermann et al. | 219/98 |
| 2004/0109740 | A1 | * | 6/2004 | Nilsen et al. | 411/171 |
| 2005/0062285 | A1 | * | 3/2005 | Hobson et al. | 285/179 |

FOREIGN PATENT DOCUMENTS

| | | |
|---|---|---|
| DE | 196 11 711 A1 | 10/1997 |
| DE | 196 22 958 C1 | 11/1997 |
| DE | 199 22 679 A1 | 11/2000 |
| EP | 1 060 822 A2 | 12/2000 |
| EP | 1 072 352 A1 | 1/2001 |
| EP | 1 264 656 A1 | 12/2002 |
| GB | 755 226 A | 8/1956 |
| GB | 1 395 632 A | 5/1975 |
| JP | 05 028857 A | 2/1993 |
| JP | 06 091377 A | 4/1994 |
| JP | 07 256457 A | 10/1995 |
| JP | 08 243762 A | 9/1996 |
| JP | 09 182967 A | 7/1997 |
| JP | 10 128543 A | 5/1998 |
| JP | 11 090637 A | 4/1999 |
| JP | 2001 105142 A | 4/2001 |
| JP | 2002 361427 A | 12/2002 |
| WO | WO 03/022504 A2 | 3/2003 |

OTHER PUBLICATIONS

"Electrical Resistance" from Wikipedia, the free encyclopedia. Web page found at http://en.wikipedia.org/wiki/Electrical_resistance, pp. 1-5.*

* cited by examiner

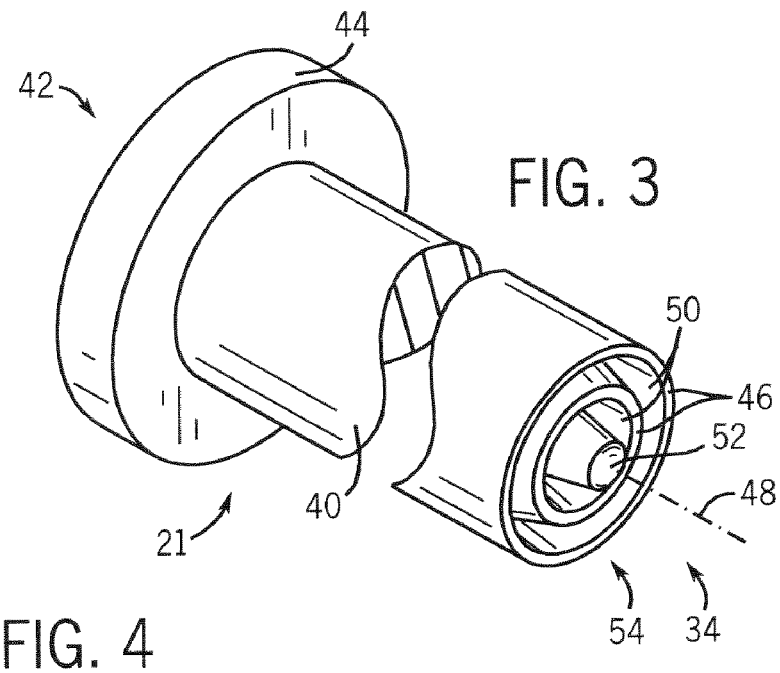
FIG. 3
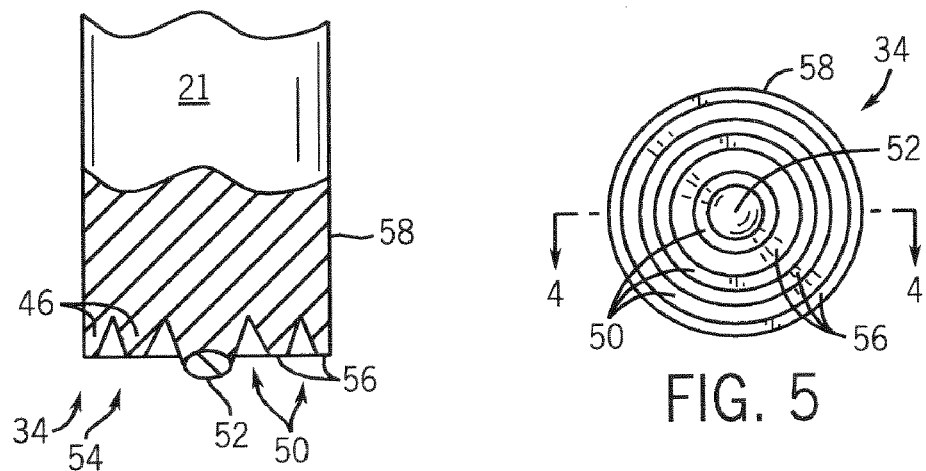
FIG. 4
FIG. 5
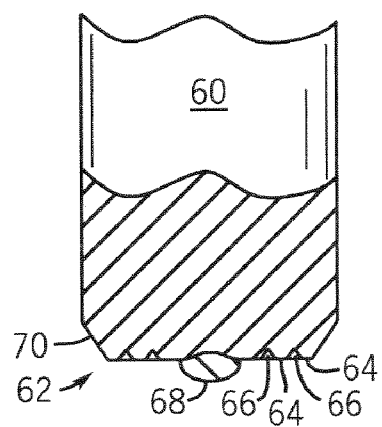
FIG. 6
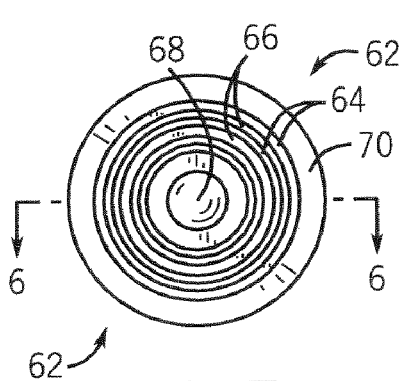
FIG. 7

WELDING STUD

BACKGROUND OF INVENTION

The present invention relates generally to welding systems and, more particularly, to a welding stud for stud welding applications.

Stud welding is a welding process that utilizes a localized burst of current between a metallic fastener and a metallic workpiece. A stud welding system has a power source, a stud gun, a pair of cables that connect the stud gun to the power source, and a stud that is welded to a workpiece. In most instances, although not required, the fastener and the workpiece have the same material properties. The fasteners are held and welded in place through the use of an electro-mechanical device in the stud gun.

Stud welding has applications in many industries. These industries include boiler manufacturing, ship building, auto manufacturing, and construction to name but a few. Welding a stud to a workpiece is an easy and efficient means of securing a fastener device to the workpiece. Studs are also provided in a variety of shapes and materials such that welding studs to a workpiece can be used to differentiate between further systems to be attached to the workpiece depending on the type of stud welded thereto.

The quality of the weld which attaches the stud to the workpiece partially determines the amount of load the stud can support. A poor quality weld can result in failure of the weld between the stud and the workpiece. Weld failure associated with poor weld quality is difficult to predict and is often designed around by over welding the stud rather than improving the welding efficiency of the weld stud. A low efficiency in the stud welding process is partially due to low, effective contact resistance between the stud and a workpiece.

The efficiency of the weld between the stud and the workpiece is partially determined by the physical construction of the welding stud used and the condition of the interface between the welding stud and the workpiece. A poor interface between the welding stud and the workpiece detrimentally affects arc performance and can result in weld failure. The physical construction of the weld end of the welding stud also affects the quality of a weld between a welding stud and a workpiece. If the weld end of the welding stud is poorly constructed, an incomplete weld can be formed between the welding stud and the workpiece after the termination of the welding process.

Therefore, it would be desirable to design a welding stud for stud welding applications that maximizes arc characteristics between the welding stud and the workpiece, thereby maximizing weld quality and welding efficiency.

SUMMARY OF INVENTION

The present invention is directed to a welding stud that solves the aforementioned drawbacks. A welding stud and method of manufacturing a welding stud are disclosed that include at least one ridge, but preferably, a plurality of ridges formed in the weld end of the welding stud. The plurality of ridges localize a current passed through the weld end of the welding stud during a welding operation. By localizing the current through the weld end of the stud, the stud can be welded to a workpiece faster and with lower energy than welding studs without the current localizing construction of the invention.

Therefore, in accordance with one aspect of the present invention, a welding stud is disclosed which has a body extending between a first and a second end. The first end is constructed to engage a stud welding gun. At least one recess is formed in the second end that increases the effective surface area of the second end and is designed to decrease an effective arc area of the second end. Such a construction allows the welding stud to be quickly and efficiently welded to a workpiece.

In accordance with another aspect of the present invention, a welding stud having a body is disclosed. The body extends from a connector end constructed to engage a stud welding gun. A weld end of the welding stud, opposite the connector end, has at least one protrusion and is constructed to be welded to a workpiece. The protrusion extends outwardly to space a majority of the weld end having a non-planar surface from a workpiece. Such a construction reduces the cross-sectional area of the weld end and localizes current passing therethrough during a welding operation.

According to a further aspect of the present invention, a method of manufacturing a welding stud is disclosed. The method includes providing a welding stud having a first end and a second end, forming the first end to engage a stud welder, and forming the second end with increased resistance to current flow as compared to a welding stud having a nipple and a generally planar surface thereabout.

In accordance with yet another aspect of the present invention, a welding stud is disclosed. The welding stud has a first end constructed to engage a stud welding gun. A body extends from the first end to a face of a weld end. The welding stud includes means for localizing current density in the face of the weld end of the welding stud.

Various other features, objects and advantages of the present invention will be made apparent from the following detailed description and the drawings.

BRIEF DESCRIPTION OF DRAWINGS

The drawings illustrate and include one preferred embodiment presently contemplated for carrying out the invention.

In the drawings:

FIG. 3 is a perspective view of a welding stud in accordance with the present invention that may be used with the stud welder shown in FIG. 1.

FIG. 4 is a cross-sectional view of a weld end of the welding stud shown in FIG. 3.

FIG. 5 is a plan view of the weld end of the welding stud shown in FIG. 4.

FIG. 6 is a cross-sectional view of the weld end of an alternate embodiment of a welding stud in accordance with the present invention.

FIG. 7 is a plan view of the weld end of the welding stud shown in FIG. 6.

DETAILED DESCRIPTION

Figure 1:
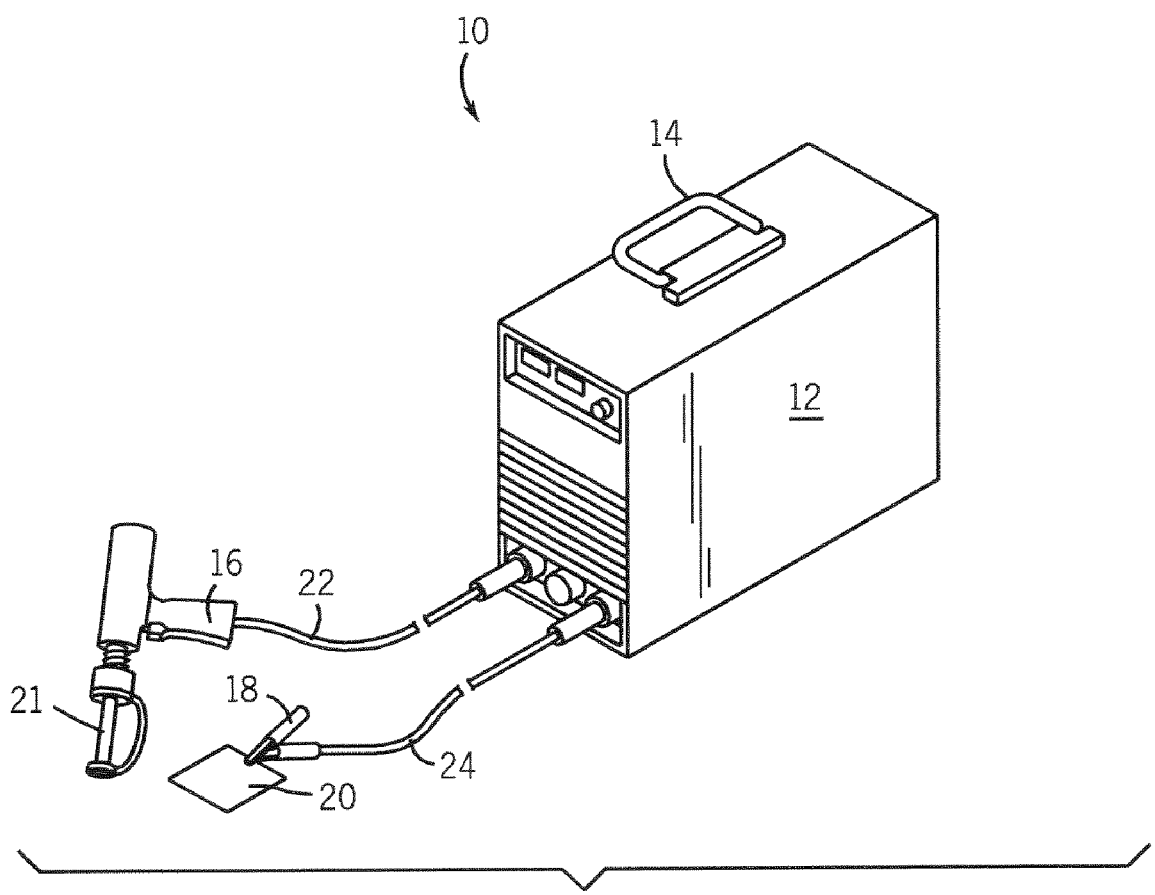
FIG. 1 is a perspective view of a stud welder apparatus according to the present invention.

FIG. 1 shows a stud welding system 10 in accordance with the present invention. Stud welding system 10 includes a housing 12 enclosing the internal components of the welding power source such as a circuit board and power source. In one embodiment, the stud welding device 10 is of such compact construction that it includes a handle 14 for easily transporting the welding system from one location to another. To effectuate the welding process, the stud welding device 10 includes a stud welding gun 16 as well as a work clamp 18. The work clamp 18 is configured to complete the welding circuit to a workpiece 20 to be welded. Connecting the stud welding gun 16 and work clamp 18 to the housing 12 is a pair of cables 22 and 24, respectively.

Figure 2:
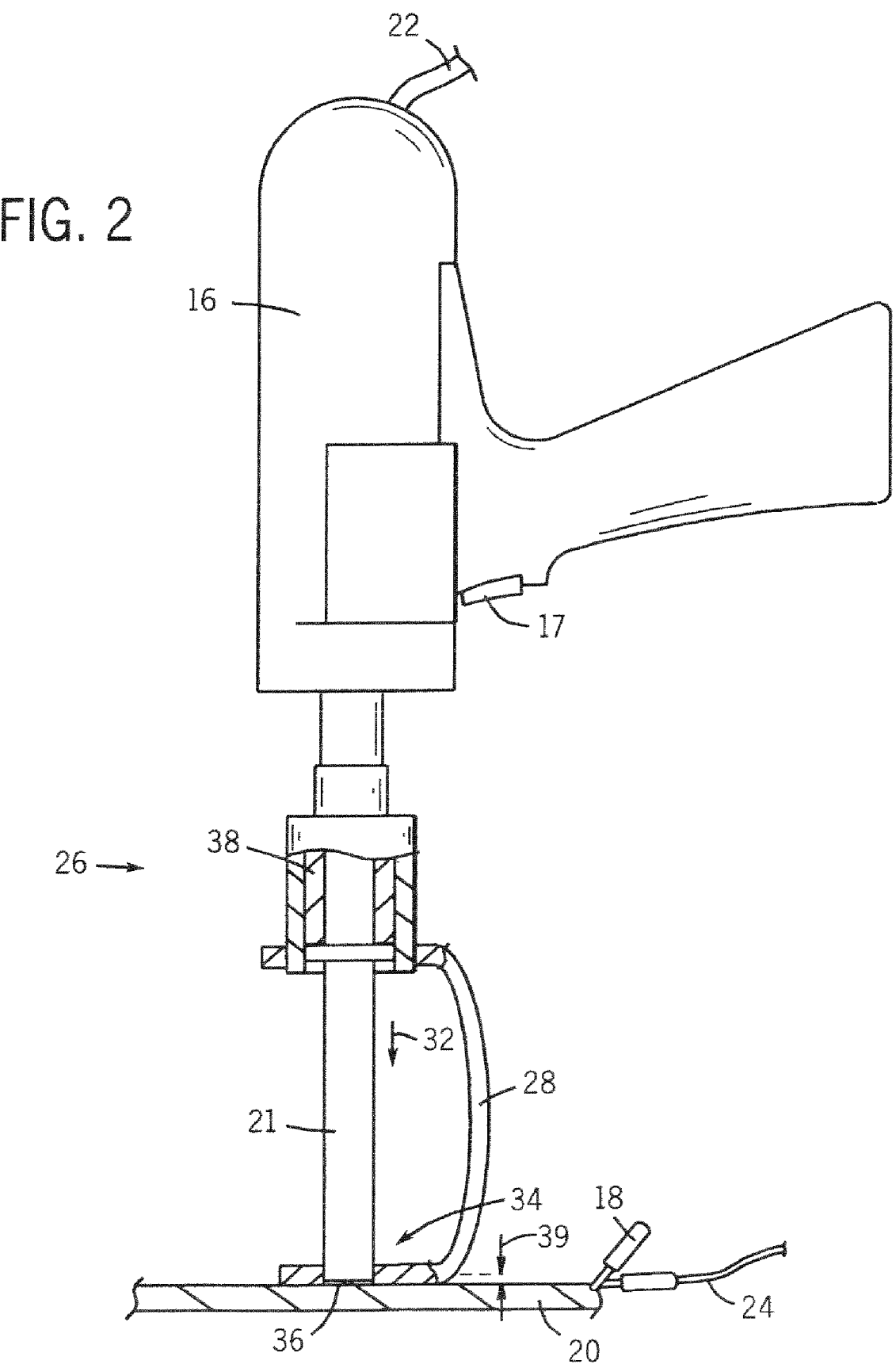
FIG. 2 is a side view of the stud welding gun of FIG. 1 in use.

Prior to a welding operation, as shown in FIG. 2, a stud 21 is placed in a work end 26 of stud welding gun 16 and in abutting engagement with workpiece 20. When a trigger 17 of stud welding gun 16 is pressed, a welding current is developed between the welding gun 16 and workpiece 20 through stud 21. An arm 28 of stud welding gun 16 is used to accommodate stud 21 and allow drawing stud 21 away from workpiece 20 to form a stud welding arc. The welding arc is formed upon drawing the stud 21 from the workpiece 20 as an electrical current 32 passes through stud 21 and workpiece 20. As electrical current 32 passes through stud 21 and workpiece 20, a weld end 34 of stud 21 and a target point 36 of workpiece 20 become molten. An inner collet 38 of stud welding gun 16 maintains a distance, indicated by arrows 39, between stud 21 and workpiece 20 during the welding process. Distance 39 is determined to be the distance required to form a proper welding arc between stud 21 and workpiece 20. After a predetermined time, stud 21 is driven into workpiece 20, thereby forming a homogenous weld between stud 21 and workpiece 20. Although a specific electro-mechanical stud welding gun and stud welding system are shown, it is understood that such is merely by way of example. Such is not intended to limit the scope of the claims presented herein.

One exemplary welding stud 21 is shown in greater detail in FIG. 3. Welding stud 21 includes a body 40 disposed between weld end 34 and a gun end 42. Gun end 42 is constructed to engage a stud welding gun as shown in FIG. 2. Additionally, gun end 42 can be constructed to engage a connector (not shown) after welding stud 21 has been welded to a workpiece. As shown in FIG. 3, gun end 42 of stud 21 includes a head 44 formed thereabout. It is understood that head 44 could be of many shapes depending on the stud gun used and the ultimate application of the stud. Head 44 only needs to be constructed to engage the work end of the stud welding gun and adaptable to provide a further connection thereto.

In the embodiment shown in FIG. 3, weld end 34 of welding stud 21 has a plurality of ridges 46 formed thereon and concentrically orientated about a center axis 48 of welding stud 21. A groove 50 is formed between adjacent ridges 46. A nipple 52 is formed in the center of weld end 34 and is surrounded by a face 54 of weld end 34 of welding stud 21. A majority of weld end 34 is occupied by face 54 with nipple 52 positioned in the center thereof. As such, face 54 has a substantially non-planar construction, which provides for localized current density during a welding process. Face 54 decreases an effective arc area between welding stud 21 and workpiece 20. During the welding process, a welding arc is formed as electrical current passes between weld end 34 of welding stud 21 and workpiece 20. During a welding operation, the non-planar construction of face 54 results in an increase in effective surface area of weld end 34 and provides a stud with a decreased contact area. The contact area being defined as that area that would contact a workpiece once plunged into the workpiece during the welding process. By localizing the current through weld end 34 during the welding process, the total amount of energy required to perform the weld is reduced resulting in a more efficient weld.

As shown in FIG. 4, grooves 50 formed in weld end 34 of welding stud 21 increase the total surface area of face 54 and reduce the cross-sectional surface area of the face. As such, grooves 50 decrease the effective arc area, between welding stud 21 and a workpiece. Ridges 46 extend to a tip 56 at face 54 and encircle nipple 52 and define the contact surface between welding stud 21 and a workpiece. Face 54 extends along weld end 34 from nipple 52 to an outer surface 58 of welding stud 21. During a welding operation, nipple 52 ensures adequate separation between face 54 and a workpiece prior to initialization of the welding process. Once the welding process is initiated, nipple 52 and tips 56 are liquefied. Grooves 50 focus the current traveling through face 54 and a workpiece at tips 56 of ridges 46. Such a construction creates a localized current density on face 54 that is higher than a local current density of a welding stud with a substantially planar welding face. As ridges 46 and nipple 52 are liquefied during the welding process, grooves 50 decrease until the stud and workpiece become one.

As shown in FIG. 5, ridges 56 and grooves 50 are positioned generally circumferentially about nipple 52 on weld end 34 of welding stud 21. Ridges 56 and grooves 50 also extend generally uniformly from nipple 52 to outer surface 58 of welding stud 21. As shown in FIG. 5, welding face 54 is geometrically centered about the longitudinal axis 48, shown in FIG. 3 of welding stud 21. Such a construction ensures a generally uniform arcing about face 54 of welding stud 21, after nipple 52 is liquefied, during a welding process. The increased resistance associated with welding stud 21 ensures uniform welding of studs to a workpiece in a repeatable and efficient manner, thereby creating an efficient weld process.

An alternate welding stud 60 is shown in FIGS. 6 and 7. Welding stud 60 is similar to welding stud 21 in that it includes a plurality of ridges 64 and a plurality of grooves 66 disposed about a nipple 68 on a weld end 62 of welding stud 60. Grooves 66 do not extend as deeply into weld end 62 of welding stud 60, FIG. 6, as grooves 50 extend into weld end 34 of welding stud 21, FIG. 4, however, weld end 62 has a tapered perimeter 70. Tapered perimeter 70 reduces the effective surface area of weld end 62 to a workpiece during a welding process. As shown in FIG. 7, weld end 62 of welding stud 60 is similar to weld end 34 of welding stud 21 shown in FIG. 5 in that both weld end 34 and 62 have a plurality of generally concentric grooves and ridges about a nipple.

Tapered perimeter 70 of weld stud 60 reduces the effective cross-sectional area of weld end 62 during a welding process. Tapered perimeter 70 and grooves 66 each contribute to concentrate a current passed through weld end 62 of welding stud 60 at ridges 64. As such, after a welding process is initiated and nipple 68 is liquefied, the welding current is localized, or concentrated, at ridges 64.

Figure 8:
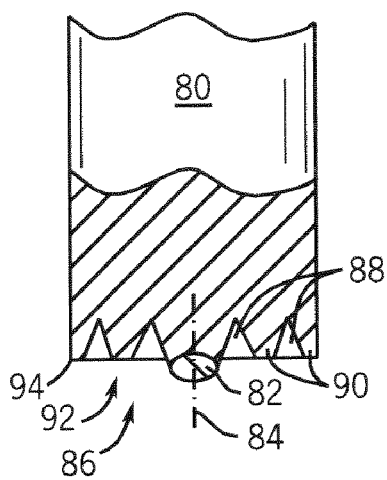
FIG. 8 is a cross-sectional view of the weld end of another alternate embodiment of a welding stud in accordance with the present invention.
Figure 9:
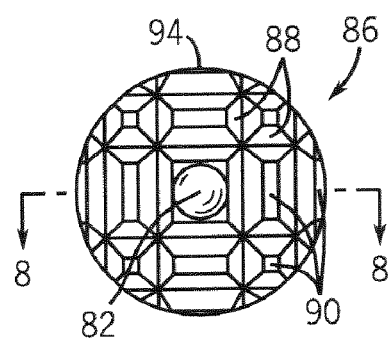
FIG. 9 is a plan view of the weld end of the welding stud shown in FIG. 8.
Figure 10:
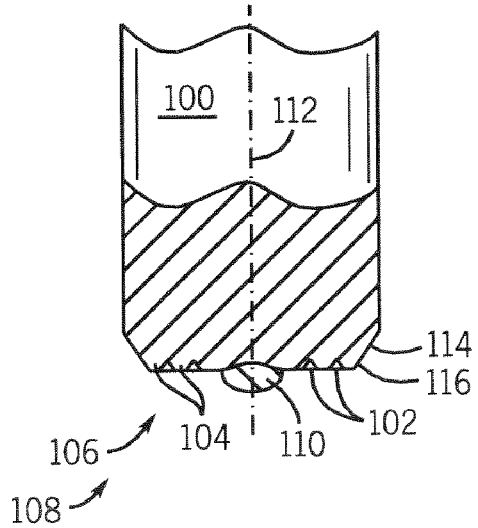
FIG. 10 is a cross-sectional view of the weld end of yet another alternate embodiment of a welding stud in accordance with the present invention.
Figure 11:
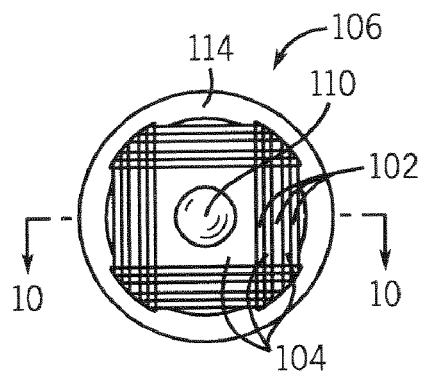
FIG. 11 is a plan view of the weld end of the welding stud shown in FIG. 10.

Rather than the circular pattern of the grooves and ridges of welding studs 21 and 60, FIGS. 4-7, a welding stud 80, FIGS. 8 and 9, and another welding stud 100, FIGS. 10 and 11, have a pattern formed in the welding end based on a relatively simple geometric pattern. Welding stud 80, shown in FIGS. 8 and 9, has a cross-sectional shape that is similar to the cross-sectional shape of welding stud 21, as shown in FIG. 4. In Fig.

a nipple 82 is positioned on a center axis 84 of a weld end 86 of welding stud 80. A plurality of grooves 88 and a plurality of ridges 90 are formed in a face 92 of weld end 86. Face 92 extends from nipple 82 to a perimeter 94 of weld end 86 of welding stud 80. FIG. 9 shows the generally geometric pattern formed in weld end 86 by the plurality of linear grooves and ridges.

Welding stud 100, shown in FIGS. 10 and 11, has a plurality of recesses 102 formed between a plurality of adjacent ridges 104. Recesses 102 and ridges 104 are formed on a face 106 of a weld end 108 of welding stud 100. A nipple 110 extends past face 106 along an axis 112 of welding stud 100 and initiates the contact of welding stud 100 with a workpiece. A taper 114 can be formed about a perimeter 116 of face 106 of welding stud 100 to reduce the effective cross-sectional area of weld end 108 of welding stud 100.

Comparing welding studs 80 and 100, as shown in FIGS. 9 and 11, with welding studs 21 and 60, as shown in FIGS. 5 and 6, it should be apparent that the present invention discloses a welding stud having a non-planar face between the nipple and the perimeter of the welding end of the welding stud. Regardless of the pattern formed on the face of the weld end, a welding stud having a series of ridges and grooves formed in the face of the welding end is more efficiently welded to a workpiece than a welding stud with a generally planar face. The non-planar face provides for localized current density at the ridges during the welding process. Localizing the current increases the efficiency with which the welding stud can be welded to a workpiece. Whether the pattern formed in the face of the weld end forms a curvilinear pattern, as shown in FIGS. 5 and 7, or a rectilinear pattern, as shown in FIGS. 9 and 11, each of the geometric patterns yield a welding stud which benefits from localized current densities during a welding process. The patterns shown in the figures are merely by way of example and in no way limit the claims herein. It is equally understood that the patterns of grooves and ridges formed in the faces of the welding studs disclosed herein could be by any one of etching, stamping, machining, etc.

Figure 12:
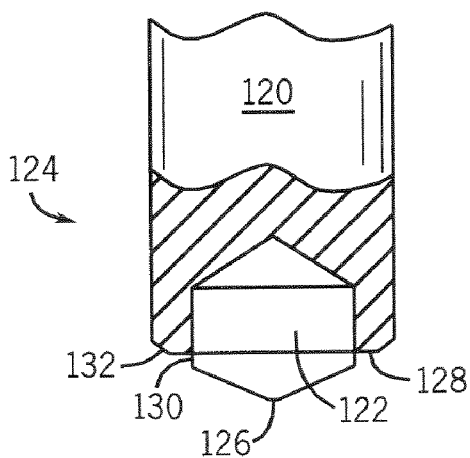
FIG. 12 is a cross-sectional view of the weld end of another alternate embodiment of a welding stud in accordance with the present invention.
Figure 13:
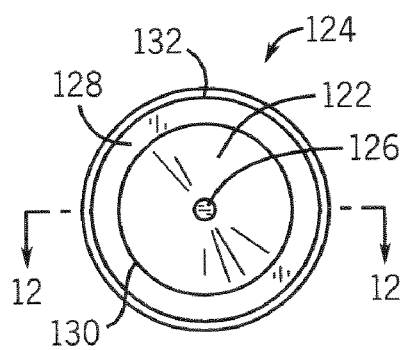
FIG. 13 is a plan view of the weld end of the welding stud shown in FIG. 12.

Another welding stud 120 is shown in FIGS. 12 and 13. A flux capsule 122, or a combination of powered metal and flux, is enclosed in the weld end 124 of welding stud 120. A contact tip 126 of flux capsule 122 functions similar to the nipple of the previous embodiments and extends past a face 128 of weld end 124 of welding stud 120. Contact tip 126 of flux capsule 122 is constructed to initiate contact with a workpiece during a welding operation. During a welding operation, flux capsule 122 inhibits atmospheric contaminants from polluting the pool of molten weld material generated during the welding process. As such, flux capsule 122 ensures a high quality, unpolluted weld between stud 120 and a workpiece. Face 128 extends between a perimeter 130 of flux capsule 122 to a tapered perimeter 132 of weld end 124 of welding stud 120. After flux capsule 122 is liquefied during the initialization of an arc, the current across welding stud 120 is localized at face 128 of welding stud 120. As such, welding stud 120 localizes a welding current at face 128 after the initialization of the welding process that liquefies flux capsule 122. It is understood that flux capsule 122 could be incorporated into any/each of the previously disclosed welding studs in order to achieve the benefits of having a flux introduced into a weld.

In the case of a stud using a flux capsule, a decrease in the amount of energy needed to weld a stud of a given diameter can be achieved when compared to the amount of energy required to weld a stud having a nipple and a generally planar face. The energy decreases result from a higher current density through the weld stud of the workpiece. In this case, the path of least resistance extends through the metal portion of the stud around the flux capsule. The flux capsule, by having a relatively high electrical resistance, allows relatively low levels of current to flow through it. This results in increased current density in the metal portion of the stud around the flux capsule. This construction requires lower energy levels for welding.

Alternatively, it is understood that the flux capsule could be replaced with powdered metals. Similar to the flux capsule, the powdered metals results in a decrease in the amount of energy required to weld a given stud diameter when compared to a stud with a nipple and planar face. The powered metal capsule has a relatively high electrical resistance compared to the solid metal portion of the stud extending therearound. The energy decreases result from the relatively high current density through the solid metal portion of the stud and thereby around the powdered metal capsule. Such a construction results in increased local current densities which provides for efficient welding with lower energy.

Each of the embodiments of the present invention realize the benefits achieved by a welding stud having a generally non-planar weld end. The non-planar face of the weld end results in decreased contact area between the welding stud and a workpiece during a welding process, an increase in the total surface area of the weld end, and provides localized current density during a welding process. As such, a welding stud constructed according to the invention requires less energy to weld the stud to a workpiece compared to a welding stud having a generally planar face.

Therefore, in accordance with one embodiment of the present invention, a welding stud has a body extending between a first and a second end. The first end is constructed to engage a stud welding gun and the second end has at least one recess formed therein.

In accordance with another embodiment of the present invention, a welding stud has a body extending from a connector end constructed to engage a stud welding gun. The welding stud has a weld end having at least one protrusion and is constructed to be welded to a workpiece. The protrusion extends outwardly to space a majority of the weld end having a non-planar surface from a workpiece.

According to a further embodiment of the present invention, a method of manufacturing a welding stud includes providing a welding stud having a first end and a second end, forming the first end to engage a stud welder, and forming the second end with increased resistance to current flow as compared to a welding stud having a nipple and a generally planar surface thereabout.

In accordance with a further embodiment of the present invention, a welding stud has a first end constructed to engage a stud welding gun. A body extends from the first end to a face of a weld end. The welding stud includes means for localizing current density in the face of the weld end of the welding stud.

The present invention has been described in terms of the preferred embodiment, and it is recognized that equivalents, alternatives, and modifications, aside from those expressly stated, are possible and within the scope of the appending claims.

The invention claimed is:

1. A welding stud comprising:
  a body having a first end and a second end, the first end having an outer diameter that is greater than an outer diameter of the second end;
  the first end constructed to engage a stud welding gun;
  the second end having a central point on a weld face and at least one ridge and hollow recess formed in the weld face and spaced away from the central point; and wherein the central point has a diameter greater than a thickness of the at least one ridge and has a planar surface that is in a common plane with the at least one ridge.

2. The welding stud of claim 1 wherein the recess is designed to decrease an effective arc area of the second end to a workpiece.

3. The welding stud of claim 1 further comprising one of a powdered metal encapsulated and a combination of flux and powdered metal encapsulated in the second end.

4. The welding stud of claim 1 further comprising a plurality of recesses, wherein the recesses are concentric about an axis of the weld face of the stud.

5. The welding stud of claim 1 further comprising a plurality of hollow recesses formed in the weld face, wherein the hollow recesses are annular grooves.

6. The welding stud of claim 1 further comprising a nipple extending from the second end at a center axis of the stud for initiating contact with a workpiece and defining a gap between the workpiece and the second end.

7. The welding stud of claim 1 wherein the first end has a flange extending outwardly to engage the stud welding gun.

8. The welding stud of claim 1 further comprising a plurality of recesses, wherein the recesses are geometrically centered about the second end.

9. The welding stud of claim 1 further comprising a plurality of hollow recesses formed in the weld face, wherein the plurality of hollow recesses are defined by a plurality of protrusions extending away from the welding stud and toward a workpiece between adjacent hollow recesses.

10. A welding stud comprising:
a connector end constructed to engage a stud welding gun;
a solid cored body extending from the connector end;
a weld end constructed to be welded to a workpiece having a plurality of ridges and grooves formed therein; and
wherein the weld end includes at least one protrusion having a diameter greater than a thickness of each of the plurality of ridges and a planar surface that is in a common plane with the plurality of ridges.

11. The welding stud of claim 10 wherein the entire area of the weld end is welded during a welding process.

12. The welding stud of claim 11 wherein the plurality of ridges are geometrically centered about a longitudinal axis of the welding stud and distanced from a center of the weld end.

13. The welding stud of claim 11 wherein the plurality of ridges are annular.

14. The welding stud of claim 13 wherein the plurality of ridges are concentric.

15. The welding stud of claim 11 wherein each ridge has a base and a height and the height of each ridge is substantially similar to a width of the base of each ridge.

16. The welding stud of claim 10 further comprising one of a combination of flux and powdered metal capsule and a powdered metal capsule within the weld end.

17. The welding stud of claim 10 wherein the at least one protrusion includes a nipple constructed of the same material of the welding stud and extending from a center of the weld end beyond an outward-most tip of a non-planar surface.

18. A method of manufacturing a welding stud comprising the steps of:
providing a welding stud having a first end and a second end;
forming the first end to engage a stud welder; and
forming the second end to be entirely welded to a workpiece and with means for increasing resistance to current flow through the second end in the area between a perimeter and a central area of the second end as compared to a welding stud having a nipple and a generally planar surface thereabout.

19. The method of claim 18 further comprising the step of forming one of a flux and powdered metal combination pocket and a granular metal pocket in the welding stud.

20. The method of claim 18 wherein the step of forming the second end further comprises stamping a plurality of grooves therein as the means for increasing resistance.

21. The method of claim 18 wherein the step of forming the second end further comprises etching a plurality of grooves therein as the means for increasing resistance 22. The method of claim 18 wherein the step of forming the second end further comprises machining a plurality of grooves therein as the means for increasing resistance.

23. The method of claim 18 wherein the step of forming the first end further comprises the step of forming the first end to engage a connector.

24. The method of claim 18 wherein the step of forming the second end increases the density of a current passed therethrough during a welding process.

25. A welding stud comprising:
a first end constructed to engage a stud welding gun;
a body extending from the first end to a face of a weld end, the face constructed to be consumed by a weld;
means for localizing current density generally uniformly about a majority of an area between an area circumscribed by a perimeter of the face of the weld end of the welding stud and a nipple proximate an axis of the body.

26. The welding stud of claim 25 wherein the means for localizing current density comprises a plurality of peaks formed in the face of the weld end about the nipple.

27. The welding stud of claim 25 wherein the first end is further constructed to engage a connector.

28. A welding stud comprising:
a body having a first end and a second end;
the first end constructed to engage a stud welding gun;
the second end having a weld face with a nipple extending therefrom and constructed thereabout with at least a portion of the weld face having decreased arc surface area, the nipple being in the same plane as the weld face having decreased arc surface area; and
wherein the body is constructed to communicate weld power from the first end to the second end along a majority of the area defined by a perimeter of a cross-section of the body.

29. A welding stud comprising:
a body having a first end and a second end, a head portion formed proximate the first end, and a shank portion extending between the head portion and the second end;
the shank portion having a generally uniform diameter along the length thereof;
the first end constructed to engage a stud welding gun; and
the second end having a surface constructed with at least one protrusion arranged to face a workpiece and a remaining surface extending about the at least one protrusion that is configured with a contact area that is decreased compared to a planar surface.

* * * * *